(12) United States Patent
Seo et al.

(10) Patent No.: US 8,259,880 B2
(45) Date of Patent: Sep. 4, 2012

(54) RECEIVERS AND METHODS FOR CONTROLLING OPERATION OF RECEIVERS

(75) Inventors: Dong Wook Seo, San Jose, CA (US); Jin Yong Chung, Seoul (KR); Gi Bong Jeong, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 757 days.

(21) Appl. No.: 12/379,144

(22) Filed: Feb. 13, 2009

(65) Prior Publication Data
US 2009/0238316 A1    Sep. 24, 2009

(30) Foreign Application Priority Data
Mar. 20, 2008   (KR) ................ 10-2008-0026001

(51) Int. Cl.
*H03D 1/04* (2006.01)

(52) U.S. Cl. ........ 375/346; 375/260; 370/208; 370/337; 370/516; 370/503; 455/502; 455/41.2; 455/67.13

(58) Field of Classification Search .............. 375/346, 375/260; 370/208, 337; 455/502, 41.2
See application file for complete search history.

(56) References Cited

U.S. PATENT DOCUMENTS

| 6,330,684 | B1 |  | 12/2001 | Yamanaka et al. |  |
|---|---|---|---|---|---|
| 7,564,775 | B2 | * | 7/2009 | Jayaraman et al. | 370/208 |
| 2005/0176371 | A1 | * | 8/2005 | Palin et al. | 455/41.2 |
| 2006/0211377 | A1 | * | 9/2006 | Shoemake et al. | 455/67.13 |
| 2006/0245347 | A1 | * | 11/2006 | Jayaraman et al. | 370/208 |
| 2007/0042795 | A1 | * | 2/2007 | Mo et al. | 455/502 |
| 2008/0165746 | A1 | * | 7/2008 | Sung et al. | 370/337 |
| 2009/0135929 | A1 | * | 5/2009 | Yamasuge | 375/260 |
| 2010/0067629 | A1 | * | 3/2010 | Gaddam et al. | 375/346 |

FOREIGN PATENT DOCUMENTS

| JP | 2002-314436 | 10/2002 |
|---|---|---|
| JP | 2003-249860 | 9/2003 |
| JP | 2003-289292 | 10/2003 |
| JP | 2004-236040 | 8/2004 |

* cited by examiner

*Primary Examiner* — Eva Puente
(74) *Attorney, Agent, or Firm* — Harness, Dickey & Pierce, PLC

(57) ABSTRACT

A method for controlling operation of a receiver may include: generating an operation control signal based on a signal-to-noise ratio (SNR) value of an $N^{th}$ symbol, wherein N is a natural number, of a hopping pattern included in a preamble of a packet; and controlling whether an $N^{th}$ symbol of each hopping pattern included in a header or payload of the packet may be processed in response to the operation control signal. A receiver may include: an operation control signal generator that may generate an operation control signal based on a signal-to-noise ratio (SNR) value of an $N^{th}$ symbol, where N is a natural number, of a hopping pattern included in a preamble of a packet; and a receiving unit that may control whether an $N^{th}$ symbol of each hopping pattern included in a header or payload of the packet is processed in response to the operation control signal.

18 Claims, 10 Drawing Sheets

FIG. 2 (CONVENTIONAL ART)

| TFC | Hopping Pattern |
|---|---|
| TFC1 | 123123 |
| TFC2 | 132132 |
| TFC3 | 112233 |
| TFC4 | 113322 |
| TFC5 | 111111 |
| TFC6 | 222222 |
| TFC7 | 333333 |

FIG. 10

| Block | (C) Power(mW) | (D) Reduce Power(mW) |
|---|---|---|
| Decoder | 1.8 | 0.9 |
| De-interleaver | 9 | 4.5 |
| De-mapper | 18 | 9 |
| FFT | 43 | 21.5 |

RECEIVERS AND METHODS FOR CONTROLLING OPERATION OF RECEIVERS

PRIORITY STATEMENT

This application claims priority from Korean Patent Application No. 10-2008-0026001, filed on Mar. 20, 2008, in the Korean Intellectual Property Office, (KIPO) the entire contents of which are incorporated herein by reference.

BACKGROUND

1. Technical Field

Example embodiments relate to receiving apparatuses and receiving methods. Also, example embodiments relate to receivers that may not process symbols having collisions with other symbols and methods for controlling operation of receivers that may not process symbols having collisions with other symbols.

2. Description of Related Art

FIG. 1 is a schematic block diagram of a conventional art communication system in which a collision between symbols may occur; FIG. 2 shows a list of time-frequency codes (TFC) and hopping patterns; and FIG. 3 is a drawing explaining a case in which a collision occurs between symbols in the conventional art communication system illustrated in FIG. 1.

Referring to FIG. 1, a conventional art communication system (e.g., a multi-band Orthogonal Frequency Division Multiplexing (OFDM) system 10), may include a plurality of base stations 11 and 13, and/or a plurality of mobile terminals (or mobile stations) 15 and 17. Referring to FIGS. 1 and 2, first base station 11 and first mobile terminal 15 may communicate with each other through TFC1 (i.e., a packet including a hopping pattern of "123123"), and/or second base station 13 and second mobile terminal 17 may communicate with each other through TFC4 (i.e., a packet including a hopping pattern of "113322").

Thus, as illustrated in FIG. 3, if first mobile terminal 15 communicating with first base station 11 through TFC1 and second mobile terminal 17 communicating with second base station 13 through TFC4 at the same time, and if they may be in a range at which Inter Symbol Interference (ISI) may occur, ISI may arise in a maximum of 3 symbols among the 6 symbols included in each of TFC1 and TFC4 (for example, a first symbol 1, a third symbol 3, and/or a fifth symbol 2). As used in this application, the ISI is described as a collision between symbols or simply a collision.

FIGS. 4A and 4B show an example structure of a packet and/or an SNR value when a collision may occur between symbols. As illustrated in FIG. 4A, a packet may include a preamble, channel estimation (CE), header, and/or payload. For example, the preamble may include four TFC (four hopping patterns) (i.e., 24 symbols), the CE may include one TFC (one hopping pattern) (i.e., 6 symbols), and/or the header and payload, respectively, may include a plurality of TFCs.

As illustrated in FIG. 4B, even when a collision occurs at a first symbol and/or a fourth symbol of each TFC1 (123123), a conventional receiver may perform fast Fourier transformation, de-mapping, de-interleaving, and/or decoding on all symbols included in a received packet. Therefore, a conventional art receiver may consume electric power unnecessarily.

SUMMARY

Example embodiments may provide receivers that may control whether reception of a symbol included in a header or payload of a packet may be processed, in order to reduce unnecessary power consumption. Example embodiments also may provide methods for controlling operation of receivers that may control whether reception of a symbol included in a header or payload of a packet may be processed, in order to reduce unnecessary power consumption.

According to example embodiments, a method for controlling operation of a receiver may include: generating an operation control signal based on a signal-to-noise ratio (SNR) value of an $N^{th}$ symbol, wherein N is a natural number, of a hopping pattern included in a preamble of a packet; and/or controlling whether an $N^{th}$ symbol of each hopping pattern included in a header or payload of the packet is processed in response to the operation control signal.

According to example embodiments, a receiver may include: an operation control signal generator that may generate an operation control signal based on a signal-to-noise ratio (SNR) value of an $N^{th}$ symbol, where N is a natural number, of a hopping pattern included in a preamble of a packet; and/or a receiving unit that may control whether an $N^{th}$ symbol of each hopping pattern included in a header or payload of the packet is processed in response to the operation control signal.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 2 shows a list of time-frequency codes (TFC) and hopping patterns;

FIG. 10 shows examples of a power consumed in a conventional receiver and a receiver according to example embodiments illustrated in FIG. 5 and/or 6 when a collision between symbols may occur.

DETAILED DESCRIPTION OF EXAMPLE EMBODIMENTS

Figure 1:
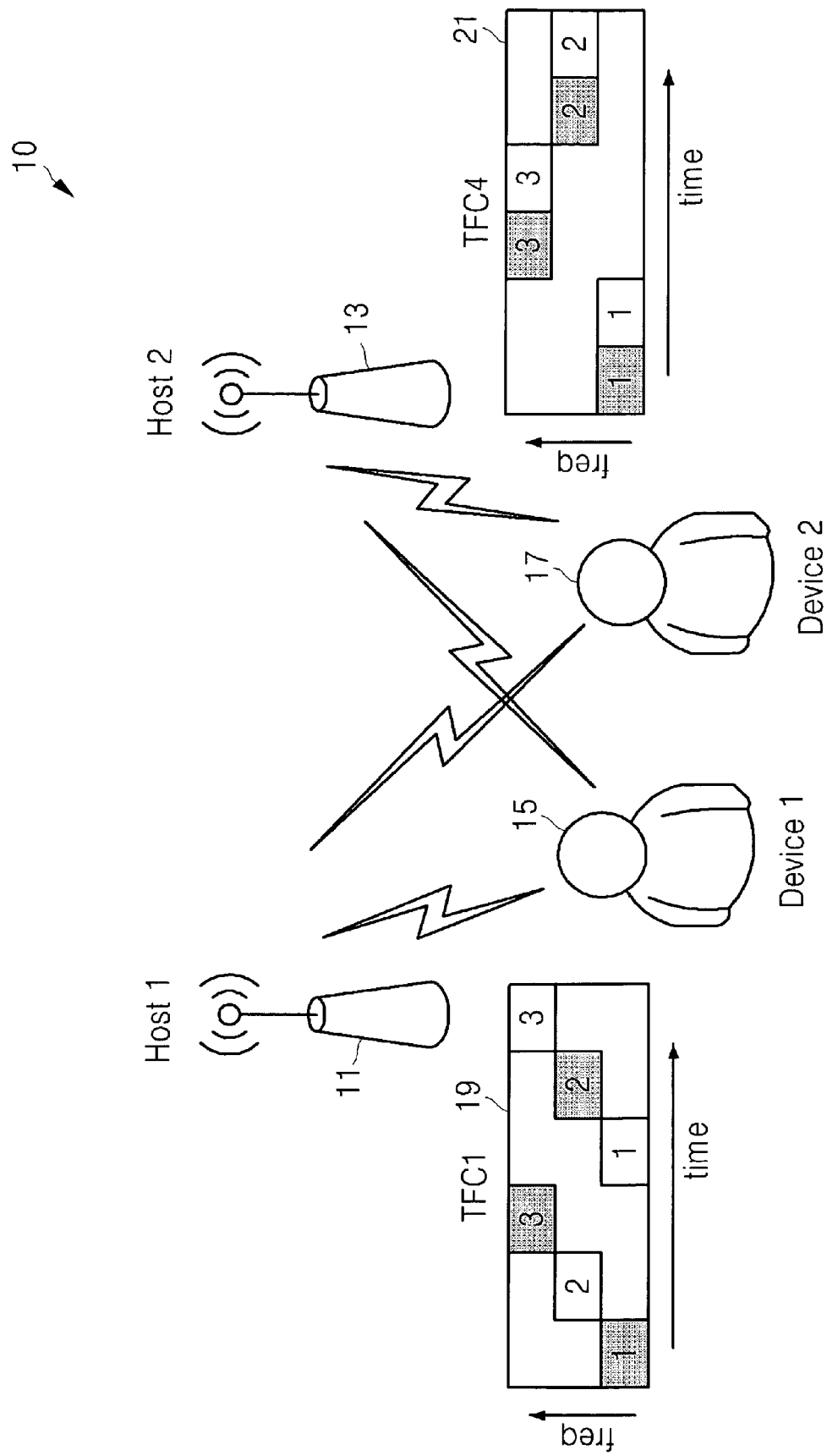
FIG. 1 is a schematic block diagram of a conventional art communication system in which a collision between symbols may occur.
Figure 3:
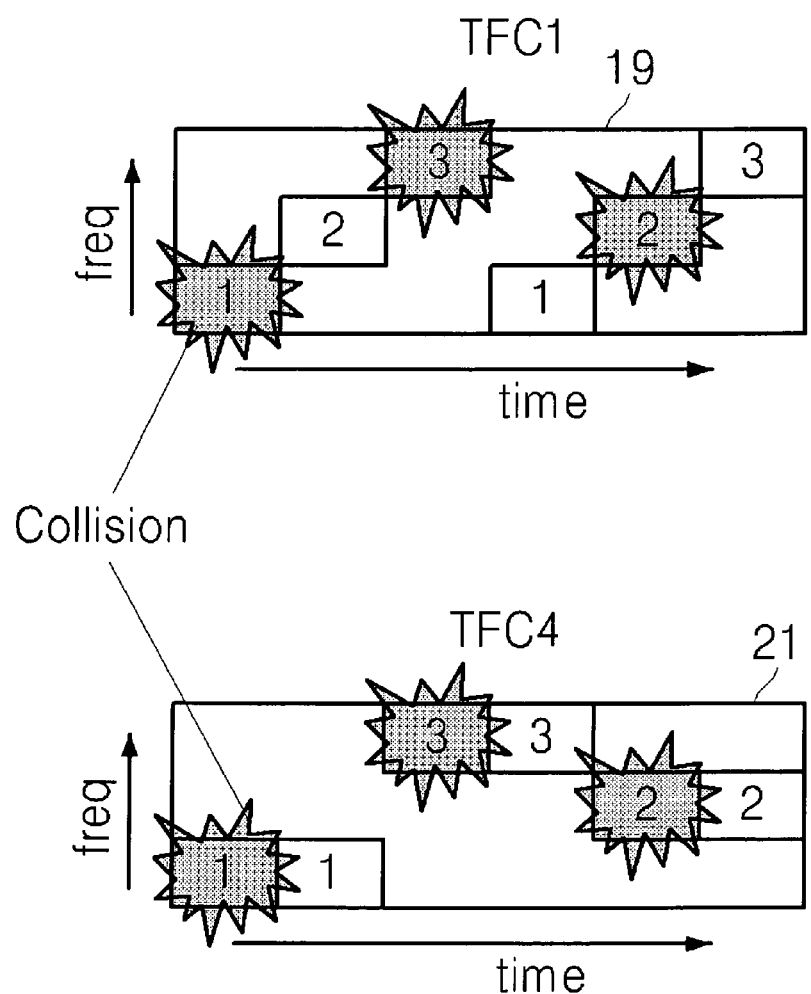
FIG. 3 is a drawing explaining a case in which a collision occurs between symbols in the conventional art communication system illustrated in FIG. 1.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 5:
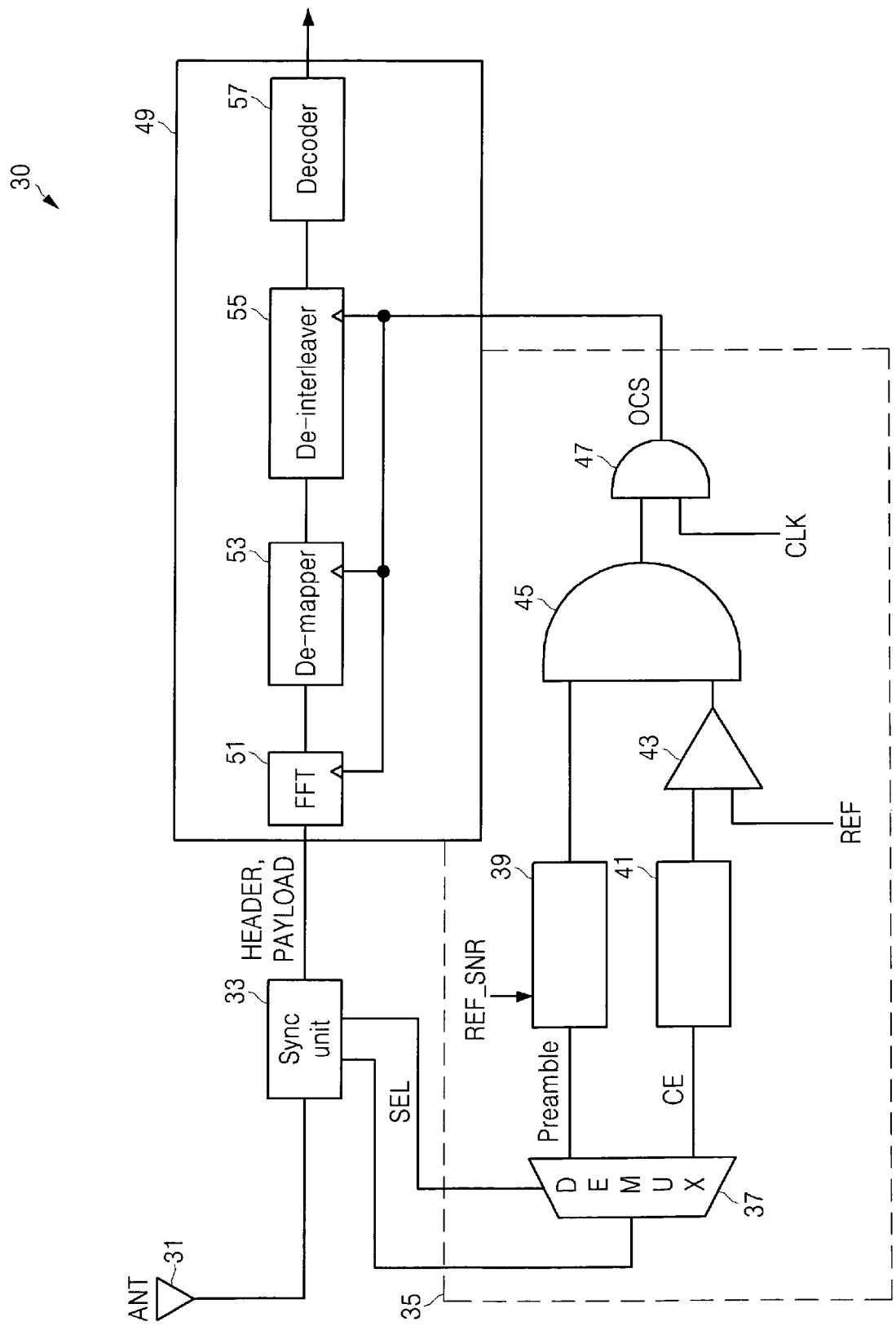
FIG. 5 shows a schematic block diagram of a receiver according to example embodiments.

FIG. 5 shows a schematic block diagram of a receiver according to example embodiments. Referring to FIG. 5, receiver 30, that may be used as an OFDM receiver and/or a multi-band OFDM receiver, may include antenna 31, synchronization unit 33, operation control signal generator 35, and/or receiving unit 49. Receiver 30 may further include an analog-to-digital converter (not shown) embodied, for example, between antenna 31 and synchronization unit 33.

Figure 4A:
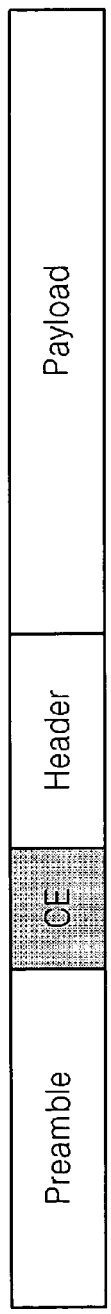
FIG. 4A shows an example structure of a packet.
Figure 4B:
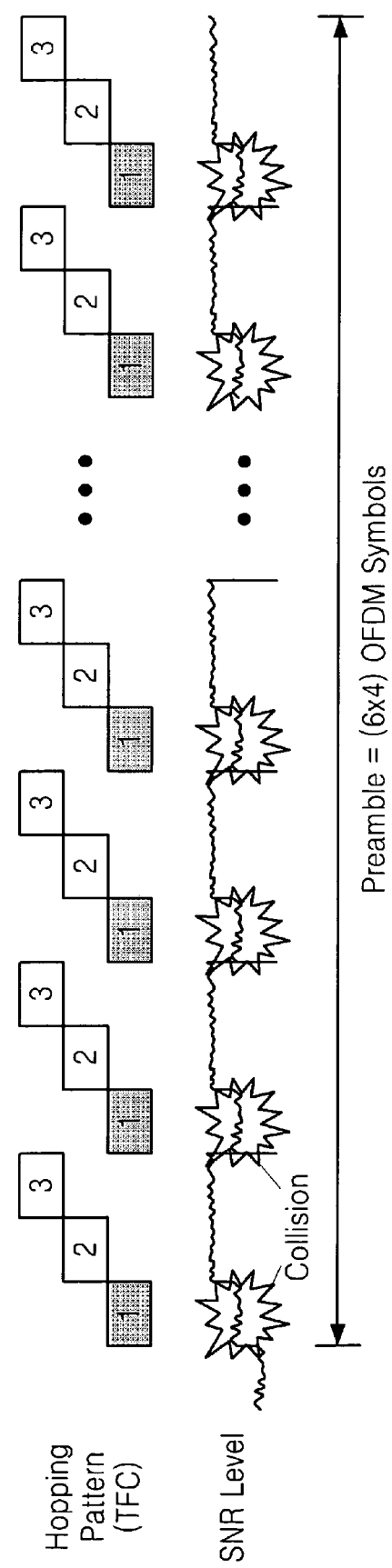
FIG. 4B shows an SNR value when a collision may occur between symbols.

Synchronization unit 33 may receive a packet output from a base station and/or input through a channel and/or antenna 31 (e.g., a packet having a structure similar to that of FIG. 4A), may output a preamble and/or channel estimation (CE) of the received packet (for example, sequentially) to operation control signal generator 35, and/or may transmit a header and/or a payload to receiving unit 49 (for example, in order).

Operation control signal generator 35—capable of supplying clock signal CLK and/or operation control signal OCS having, for example, a ground voltage level, to receiving unit 49—may include de-multiplexer (demux) 37, first SNR calculator 39, second SNR calculator 41, comparator 43, first logic gate 45, and/or second logic gate 47. According to example embodiments, first logic gate 45 and second logic gate 47 may be embodied as one logic gate.

Demux 37 may output a preamble of a received packet to first SNR calculator 39 in response to select signal SEL output from synchronization unit 33 (e.g., select signal SEL having a first level (for example, a high level)).

First SNR calculator 39 may determine each SNR value (for example, in dB) of M symbols, where M is a natural number (e.g., M may be 1, 2, 3, . . . ), that may comprise a hopping pattern of a preamble output from demux 37, may compare each of the determined M SNR values (e.g., M may be 6) with a reference SNR value REF_SNR, and/or may store M-bit data (e.g., M may be 6) in an internal memory (not shown) according to each comparison result. According to example embodiments, first SNR calculator 39 may be referred to as a collision detector. Here, reference SNR value REF_SNR may be adjustable. That is, first SNR calculator 39 may determines an SNR value by symbol, may compare a determined SNR value with a reference SNR value REF_SNR, and/or may generate data "0" or "1" according to a comparison result.

Generally, an SNR value of a symbol having a collision may be less than an SNR value of a symbol not having a collision. For convenience of explanation, reference SNR value REF_SNR may be set to be less than an SNR value determined for a symbol for which a collision occurs, and it may generate data '0' if a determined SNR value is greater than or equal to a reference SNR value REF_SNR, otherwise, data '1' may be generated.

For example, data '0' may represent a symbol having a collision with a symbol of another mobile terminal, and/or data '1' may represent a symbol not having a collision with a symbol of another mobile terminal.

Figure 8:
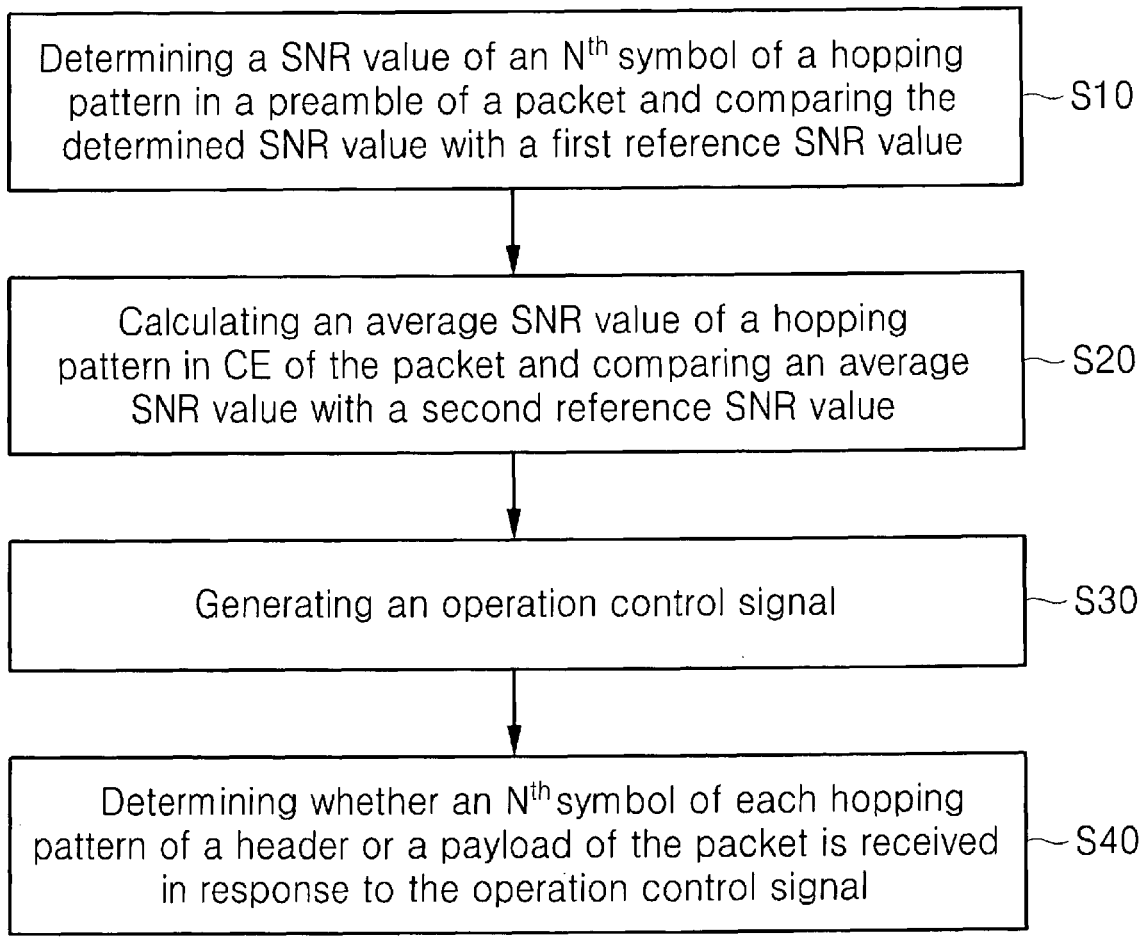
FIG. 8 is a flowchart explaining an operation control method of a receiver according to example embodiments.

That is, first SNR calculator 39 may determine an SNR value of a $N^{th}$ symbol, where N is natural number (e.g., N is greater than or equal to 1 and less than or equal to 6), of a hopping pattern in a preamble of a packet received through a channel, may compare the determined SNR value with a reference SNR value REF_SNF, may generate data '0' or '1' according to a comparison result, and/or may store a generated data '0' or '1' in an internal memory (e.g., a register or a latch) embodied in first SNR calculator 39 (S10 of FIG. 8).

The preamble may include repetitive hopping patterns (e.g., four hopping patterns (for example, 4×TFC1)), so that first SNR calculator 39 may generate M-bit data for one hopping pattern and/or may store the generated M-bit data in an internal memory.

For example, when 6-bit data stored in the internal memory is "011011", it may be known that a collision occurs at first symbol SB1 and/or fourth symbol SB4 of each hopping pattern (e.g., '123123' of FIG. 7) included in a received packet. Thus, first SNR calculator 39 may determine and/or may detect if a collision occurs and/or where a collision occurs, symbol-by-symbol.

After M-bit data (e.g., M may be 6) may be stored in an internal memory of first SNR calculator 39, demux 37 may output CE of a received packet to second SNR calculator 41 in response to select signal SEL output from synchronization unit 33 (e.g., select signal SEL having a second level (for example, low level)).

Second SNR calculator 41 may determine each SNR value of M symbols, where M is a natural number (for example, M may be 6), that may comprise a hopping pattern, and/or may calculate an average SNR value (e.g., in dB) based on the determined SNR values (S20 of FIG. 8). Since second SNR calculator 41 may be capable of determining link quality of CE, it may improve accuracy for determining whether or not a collision occurs. Thus, second SNR calculator 41 may perform a function of a link quality indicator (LQI).

Comparator 43 may receive an average SNR value calculated by second SNR calculator 41 and/or second reference SNR value REF, may compare these two values, and may output a comparison signal (S20 of FIG. 8).

For example, when an average SNR value is greater than or equal to a second reference SNR value, comparator 43 may output a comparison signal having a first level. In the opposite case, comparator 43 may output a comparison signal having a second level. In addition, second reference SNR value REF may be set to be less than a first average SNR value (i.e., an average SNR value of a hopping pattern including at least one symbol having a collision) and/or greater than a second average SNR value (i.e., an average SNR value of a hopping pattern not including at least one symbol having a collision). Accordingly, when at least one symbol having a collision is included in a hopping pattern of CE of a packet, comparator 43 may output a comparison signal having a first level (e.g., a high level).

First logic gate 45 may perform an AND operation of M-bit data (e.g., M may be 6) output, for example, sequentially from first SNR calculator 39 and a comparison signal output from comparator 43, and/or may output a signal according to a result of the operation. Second logic gate 47 may perform an AND operation of a signal output from first logic gate 45 and clock signal CLK, and/or may output operation control signal OCS according to a result of the operation (S30 of FIG. 8).

For example, when a comparison result for each hopping pattern (123123) corresponding to TFC1 calculated by first SNR calculator 39 represents "011011" and a comparison signal output from comparator 43 has a first level-since the first logic gate 45 outputs a signal having a second level while a first symbol (SB1 of FIG. 7) and/or a fourth symbol (SB4 of FIG. 7) of each hopping pattern included in a header of a packet or a payload of the packet is transmitted to the receiving unit 49—the second logic gate 47 may output an operation control signal OCS having a second level to receiving unit 49.

Additionally, while a first symbol (SB1 of FIG. 7) and/or a fourth symbol (SB4 of FIG. 7) of each hopping pattern included in a header of a packet or a payload of the packet may be transmitted to receiving unit 49, fast Fourier transformer 51 (FFT), de-mapper 53, and/or de-interleaver 55, that may be embodied in receiving unit 49, may be disabled in response to an operation control signal OCS having a second level. Also, decoder 57 may not perform an operation of decoding (decoder 57 may be, for example, a Viterbi decoder).

Therefore, electric power consumed in fast Fourier transformer 51, de-mapper 53, de-interleaver 55, and/or decoder 57 may be reduced (referring to FIG. 10). However, when a comparison result for each hopping pattern (123123) corresponding to TFC1 calculated by first SNR calculator 39 is '011011' and a comparison signal output from comparator 43 has a first level—since a first logic gate 45 outputs a signal having a first level while a second symbol (SB2 of FIG. 7), a third symbol (SB3 of FIG. 7), a fifth symbol (SB5 of FIG. 7), or a sixth symbol (SB6 of FIG. 7) of each hopping pattern included in a header of a packet and/or a payload of a packet is transmitted to a receiving unit 49—a second logic gate 47 may output operation control signal OCS substantially similar to clock signal CLK to receiving unit 49.

Accordingly, while a second symbol (SB2 of FIG. 7), a third symbol (SB3 of FIG. 7), a fifth symbol (SB5 of FIG. 7), or a sixth symbol (SB6 of FIG. 7) of each hopping pattern included in a header of a packet and/or a payload of the packet may be transmitted to receiving unit 49, fast Fourier transformer 51, de-mapper 53, and/or de-interleaver 55—which are embodied in the receiving unit 49—may perform a normal operation in response to operation control signal OCS. Also, decoder 57 may perform a decoding operation whenever a symbol is input, so that it may reduce power consumed in decoder 57 (referring to FIG. 10).

In other words, receiving unit 49 may decide whether or not an $N^{th}$ symbol of each hopping pattern included in a header of a packet and/or a payload of the packet is received (and/or processed) in response to an operation control signal OCS, which may have different states according to a symbol occurring a collision (S40 of FIG. 8).

Figure 6:
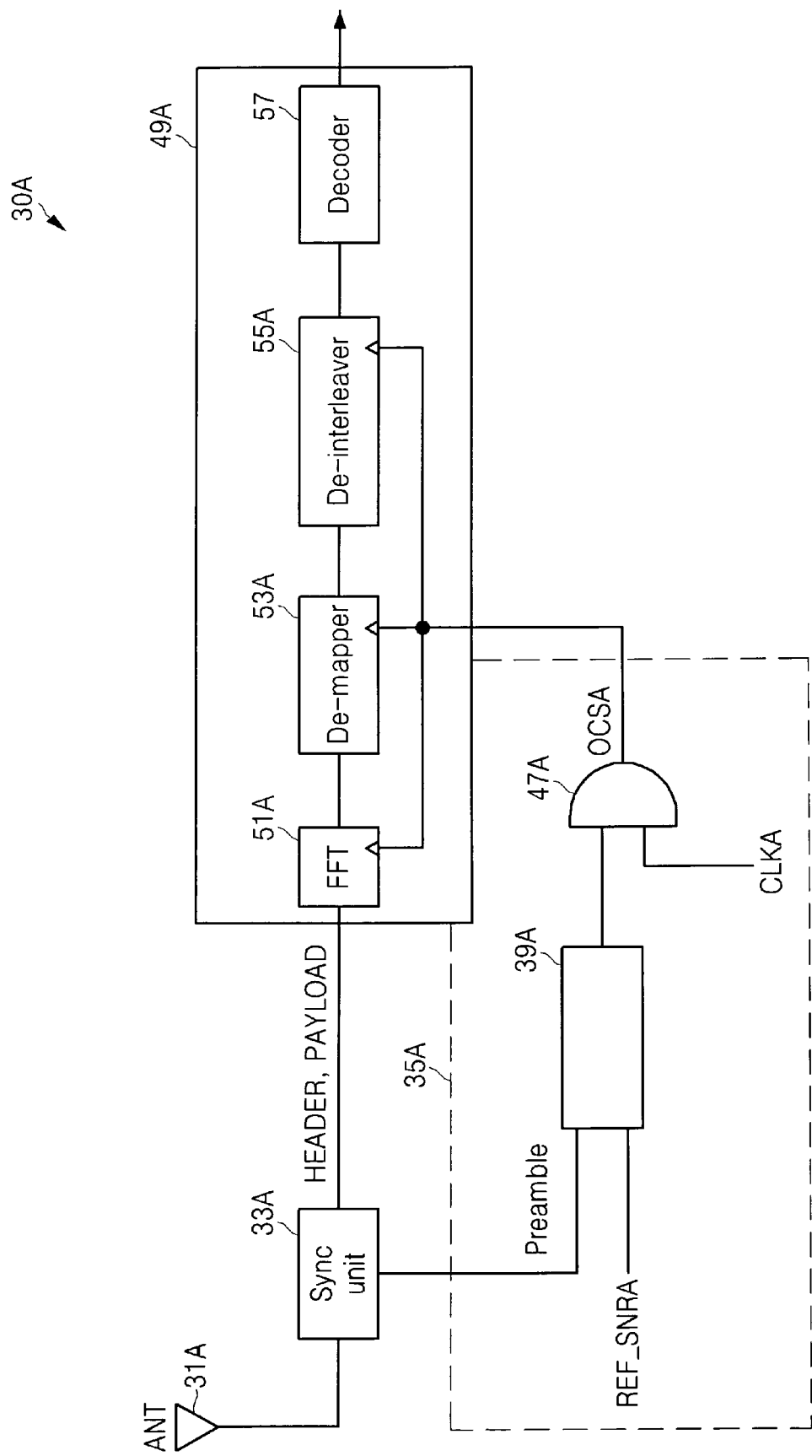
FIG. 6 shows a schematic block diagram of a receiver according to example embodiments.
Figure 9:
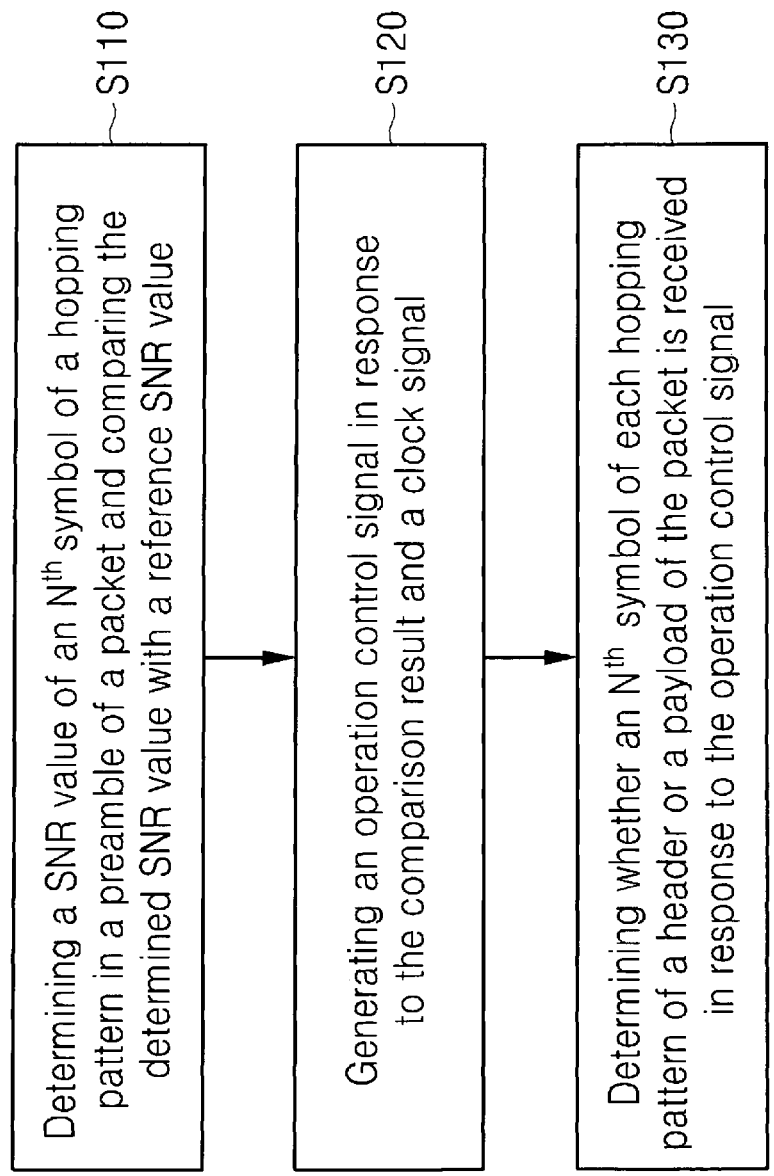
FIG. 9 is a flowchart explaining an operation control method of a receiver according to example embodiments.

FIG. 6 shows a schematic block diagram of a receiver according to example embodiments (components and signals having similar designations in FIGS. 5 and 6 may have similar functions, capabilities, and/or descriptions—for example, de-mapper 53 and de-mapper 53A). FIG. 9 is a flowchart explaining an operation control method of the receiver. Referring to FIG. 6, receiver 30A may include antenna 31A, synchronization unit 33A, SNR calculator 39A, a logic gate 47A, and/or receiving unit 49A. SNR calculator 39A and/or logic gate 47A may perform, for example, functions of an operation control signal generator 35A generating an operation control signal OCSA. According to example embodiments, SNR calculator 39A may be referred to as a collision detector.

Synchronization unit 33A may transmit a preamble of a packet, which is output from a base station and/or received through a channel and/or an antenna 31A, to SNR calculator 39A. SNR calculator 39A may determine an SNR value of a $N^{th}$ symbol (N is natural number, for example, N may be 1, 2, 3, . . . ) of a hopping pattern in a preamble of a packet, may compare the determined SNR value with a reference SNR value REF_SNRA, may generate data '0' or '1' according to a comparison result, and/or may store the generated data in an internal memory embodied in SNR calculator 39A (S110 of FIG. 9). As described above, data '0' may represent a symbol having a collision with a symbol transmitted to another mobile terminal.

For example, when a comparison result for each hopping pattern 123123 corresponding to TFC1 calculated by SNR calculator 39A is '011011', logic gate 47A may generate an operation control signal OCSA in response to the comparison result and clock signal CLKA (S120 of FIG. 9).

Synchronization unit 33A may transmit a header and/or a payload to receiving unit 49A, for example, in order. Receiving unit 49A may determine whether or not to process an $N^{th}$ symbol of each hopping pattern included in a header and/or a payload of a packet (S130 of FIG. 9).

Figure 7:
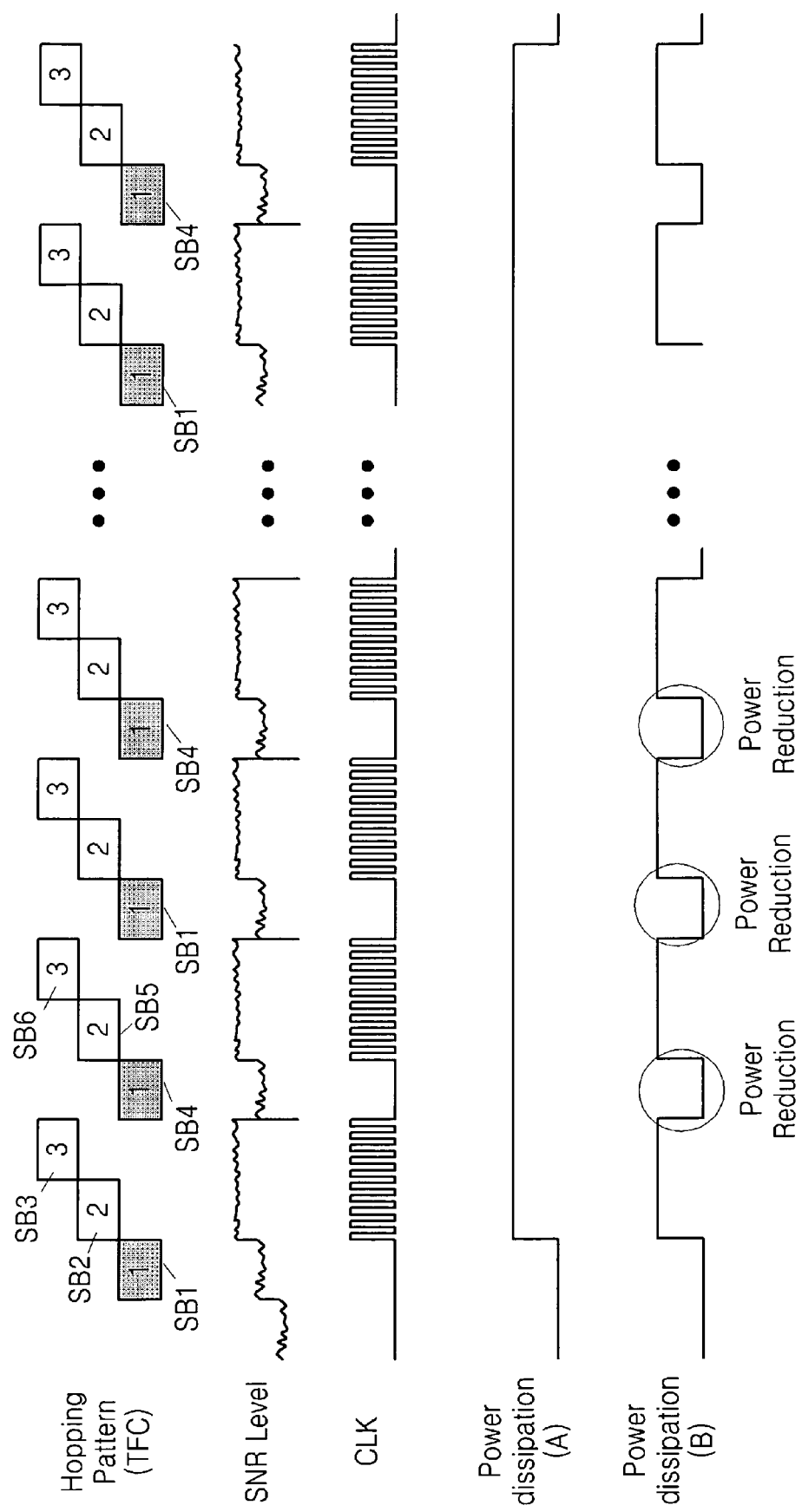
FIG. 7 shows a power consumed in a conventional receiver and a receiver according to example embodiments illustrated in FIG. 5 and/or 6 when a collision between symbols may occur.

As illustrated in FIG. 7, immediately before and/or after a first symbol (SB1 of FIG. 7) and/or a fourth symbol (SB4 of FIG. 7) of each of a plurality of hopping patterns included in a header and/or a payload of a received packet is transmitted to fast Fourier transformer 51A of receiving unit 49A, logic gate 47A may supply operation control signal OCSA having a second level to fast Fourier transformer 51A.

Therefore, fast Fourier transformer 51A may become disabled in response to operation control signal OCSA having a second level. In other words, while a first symbol and/or a fourth symbol of each hopping pattern included in a header and/or a payload of a received packet may be transmitted to fast Fourier transformer 51A, logic gate 47A may not supply clock signal CLKA to fast Fourier transformer 51A (and/or de-mapper 53A, de-interleaver 55A, and/or decoder 57A). Accordingly, power consumed in receiving unit 49A may be reduced.

Receiving unit 49A of receiver 30A according to example embodiments may not receive a symbol having a collision with a symbol transmitted to another mobile terminal among each hopping pattern, so that a power consumed in receiver 30A may be reduced.

Before and/or after a second symbol (SB2 of FIG. 7), a third symbol (SB3 of FIG. 7), a fifth symbol (SB5 of FIG. 7), and/or a sixth symbol (SB6 of FIG. 7) of each hopping pattern included in a header and/or a payload of a received packet may be transmitted to fast Fourier transformer 51A, logic gate 47A may supply operation control signal OCSA—substantially similar to clock signal CLKA—to fast Fourier transformer 51A (and/or de-mapper 53A, de-interleaver 55A, and/or decoder 57A).

Thus, fast Fourier transformer 51A may perform fast Fourier transformation on a second symbol (SB2 of FIG. 7), a third symbol (SB3 of FIG. 7), a fifth symbol (SB5 of FIG. 7), and/or a sixth symbol (SB6 of FIG. 7) of each hopping pattern included in a header and/or a payload of a received packet in response to operation control signal OCSA, (i.e., clock signal CLKA), and/or may output a fast Fourier transformed signal.

That is, while a second symbol (SB2 of FIG. 7), a third symbol (SB3 of FIG. 7), a fifth symbol (SB5 of FIG. 7), and/or a sixth symbol (SB6 of FIG. 7), that may not have a collision at each hopping pattern included in the header or the payload, may be transmitted to fast Fourier transformer 51A, logic gate 47A may supply clock signal CLKA to fast Fourier transformer 51A (and/or de-mapper 53A, de-interleaver 55A, and/or decoder 57A).

FIG. 7 shows a power (A) consumed in a conventional receiver and a power (B) consumed in a receiver according to example embodiments illustrated in FIG. 5 and/or 6, when a collision between symbols may occur. FIG. 10 shows examples of a power (C) consumed in a conventional receiver and an example of a power (D) consumed in a receiver according to example embodiments illustrated in FIG. 5 and/or 6, when a collision between symbols may occur.

Referring to FIGS. 7 and 10, a conventional receiver, that may not include an operation control signal generator for gating a clock signal supplied to a receiving unit, may supply a clock signal CLK processing a first symbol SB1 and/or a fourth symbol SB4 to a receiving unit (e.g., a fast Fourier transformer, a de-mapper, and/or a de-interleaver), even when a collision occurs at the first symbol SB1 and/or the fourth symbol SB4 of each hopping pattern included in the header or the payload of a packet. Therefore, the conventional receiver still may consume power for processing a symbol in which a collision occurred.

However, as illustrated in FIG. 5, receiver 30 may include operation control signal generator 35 for gating clock signal CLK, supplied to receiving unit 49, so that operation control signal generator 35 may not supply clock signal CLK—processing a symbol having a collision to receiving unit 49—when a collision occurs at a first symbol SB1 and/or a fourth symbol SB4 of each hopping pattern included in a header or a payload of a packet.

Similarly, as illustrated in FIG. 6, receiver 30A may include operation control signal generator 35A for gating clock signal CLKA, supplied to receiving unit 49A, so that operation control signal generator 35A may not supply clock signal CLKA—processing a symbol having a collision to receiving unit 49A—when a collision occurs at a first symbol SB1 and/or a fourth symbol SB4 of each hopping pattern included in a header or a payload of a packet.

FIG. 10 shows power consumed in first mobile terminal 15 and/or second mobile terminal 17 when first base station 11 and first mobile terminal 15 illustrated in FIG. 1 use TFC1, and second base station 13 and second mobile terminal 17 use TFC4.

Compared to a conventional receiver, a receiver according to example embodiments may be different in that, for example, power consumed in fast Fourier transformer 51 (and/or fast Fourier transformer 51A) may be reduced from 43 milliwatts (mW) to 21.5 mW; power consumed in de-mapper 53 (and/or de-mapper 53A) may be reduced from 18 mW to 9 mW, power consumed in a de-interleaver 55 (and/or de-interleaver 55A) may be reduced from 9 mW to 4.5 mW; and/or power consumed in decoder 57 (and/or decoder 57A) may be reduced from 1.8 mW to 0.9 mW (decoder 57A may be, for example, a Viterbi decoder). As described above, receiver 30 according to embodiments may transmit a symbol to receiving unit 49 selectively, so that it may reduce power consumed in receiver 30. Similarly, receiver 30A according to embodiments may transmit a symbol to receiving unit 49A selectively, so that it may reduce power consumed in receiver 30A.

A receiver according to example embodiments may detect the location of a symbol that may be included in a preamble of a packet and may have a collision, and/or may control the process of a symbol, that may be included in a header and/or a payload of the packet and may correspond to the detected location, for example, fast Fourier transformation, de-mapping, and/or de-interleaving, so that it may reduce power consumed in the receiver.

While example embodiments have been particularly shown and described, it will be understood by those of ordinary skill in the art that various changes in form and details may be made therein without departing from the spirit and scope of the present invention as defined by the following claims.

What is claimed is:

1. A method for controlling operation of a receiver, the method comprising:
    generating an operation control signal based on a signal-to-noise ratio (SNR) value of an $N^{th}$ symbol, wherein N is a natural number, of a hopping pattern included in a preamble of a packet; and
    controlling whether the $N^{th}$ symbol of each hopping pattern included in a header or payload of the packet is processed in response to the operation control signal;
    wherein generating an operation control signal comprises:
        determining the SNR value of the $N^{th}$ symbol of the hopping pattern included in the preamble of the packet;
        generating a comparison signal by comparing the determined SNR value to a reference SNR value; and
        generating the operation control signal based on the comparison signal and a clock signal.

2. The method of claim 1, wherein the operation control signal is the clock signal supplied to a fast Fourier transformer embodied in a receiving unit of the receiver.

3. A method for controlling operation of a receiver, the method comprising:
- generating an operation control signal based on a signal-to-noise ratio (SNR) value of an $N^{th}$ symbol, wherein N is a natural number, of a hopping pattern included in a preamble of a packet; and
- controlling whether the $N^{th}$ symbol of each hopping pattern included in a header or payload of the packet is processed in response to the operation control signal;
- wherein generating an operation control signal comprises:
- generating the operation control signal based on the SNR value of the Nth symbol of the hopping pattern included in the preamble of the packet and an average SNR value of a hopping pattern included in a channel estimation (CE) of the packet.

4. The method of claim 3, wherein generating an operation control signal further comprises:
- determining the SNR value of the Nth symbol of the hopping pattern included in the preamble of the packet and generating a first comparison signal after comparing the determined SNR value with a first reference SNR value;
- calculating the average SNR value of the hopping pattern included in the CE of the packet and generating a second comparison signal by comparing the calculated average SNR value with a second reference SNR value; and
- generating the operation control signal based on a combination of the first comparison signal, the second comparison signal, and a clock signal.

5. The method of claim 3, wherein the operation control signal is a clock signal supplied to a fast Fourier transformer embodied in a receiving unit of the receiver.

6. The method of claim 4, wherein generating the operation control signal based on a combination of the first comparison signal, the second comparison signal, and a clock signal comprises:
- performing a first AND operation on the first comparison signal and the second comparison signal; and
- generating the operation control signal by performing a second AND operation on a signal generated through the first AND operation and the clock signal.

7. A receiver, comprising:
- an operation control signal generator that generates an operation control signal based on a signal-to-noise ratio (SNR) value of an $N^{th}$ symbol, where N is a natural number, of a hopping pattern included in a preamble of a packet; and
- a receiving unit that controls whether the $N^{th}$ symbol of each hopping pattern included in a header or payload of the packet is processed in response to the operation control signal;
- wherein the operation control signal generator comprises:
- an SNR calculator that calculates the SNR value of the Nth symbol of the hopping pattern included in the preamble of the packet and generates a comparison signal by comparing the calculated SNR value to a reference SNR value; and
- a logic gate that generates the operation control signal in response to the comparison signal of the SNR calculator and a clock signal.

8. The receiver of claim 7, wherein the logic gate is an AND gate.

9. The receiver of claim 7, wherein the receiving unit comprises:
- a fast Fourier transformer enabled or disabled in response to the operation control signal.

10. The receiver of claim 9, wherein the receiving unit further comprises:
- at least one de-mapper, de-interleaver, or decoder;
- wherein the at least one de-mapper, de-interleaver, or decoder is enabled or disabled in response to the operation control signal.

11. A receiver, comprising:
- an operation control signal generator that generates an operation control signal based on a signal-to-noise ratio (SNR) value of an $N^{th}$ symbol, where N is a natural number, of a hopping pattern included in a preamble of a packet; and
- a receiving unit that controls whether the $N^{th}$ symbol of each hopping pattern included in a header or payload of the packet is processed in response to the operation control signal;
- wherein the operation control signal generator comprises:
- a demultiplexer that outputs the preamble of the packet or a channel estimation (CE) of the packet in response to a select signal;
- a first SNR calculator that calculates the SNR value of the Nth symbol of the hopping pattern included in the preamble of the packet output from the demultiplexer and that generates a first comparison signal by comparing the calculated SNR value with a first reference SNR value;
- a second SNR calculator that calculates an average SNR value of a hopping pattern included in the CE of the packet output from the demultiplexer;
- a comparator that compares the average SNR value of the second SNR calculator and a second reference SNR value, and that outputs a second comparison signal; and
- a logic gate that generates the operation control signal in response to a combination of the first comparison signal, the second comparison signal, and a clock signal.

12. The receiver of claim 11, wherein the logic gate comprises:
- a first AND gate that receives the first comparison signal of the first SNR calculator and the second comparison signal output from the comparator; and
- a second AND gate that generates the operation control signal by performing an AND operation on an output signal of the first AND gate and the clock signal.

13. The receiver of claim 11, wherein the receiving unit comprises:
- a fast Fourier transformer enabled or disabled in response to the operation control signal.

14. The receiver of claim 11, wherein N is 1, 2, 3, 4, 5, or 6.

15. The receiver of claim 7, wherein the operation control signal generator detects a location of at least one symbol having a collision based on the SNR value of the hopping pattern included in the preamble of the packet and generates the operation control signal based on a result of the detection.

16. The receiver of claim 15, wherein the operation control signal generator further comprises:
- a collision detector that determines each of the SNR values of a plurality of symbols of the hopping pattern included in the preamble of the packet, that compares each determined SNR value with a reference value, and that generates digital signals representing the location of the at least one symbol according to each comparison result; and
- a logic gate that generates the operation control signal in response to each of the digital signals of the collision detector and the clock signal.

17. The receiver of claim 15, wherein the receiving unit comprises:
a fast Fourier transformer enabled or disabled in response to the operation control signal.

18. The receiver of claim 17, wherein the receiving unit further comprises:
at least one de-mapper, de-interleaver, or decoder;
wherein the at least one de-mapper, de-interleaver, or decoder is enabled or disabled in response to the operation control signal.

* * * * *